Nov. 29, 1960 E. O. ENERUS 2,962,264
MEANS FOR CLEANING HEATING SURFACES IN
ECONOMIZERS AND SIMILAR EQUIPMENT
Filed March 22, 1957 2 Sheets-Sheet 2
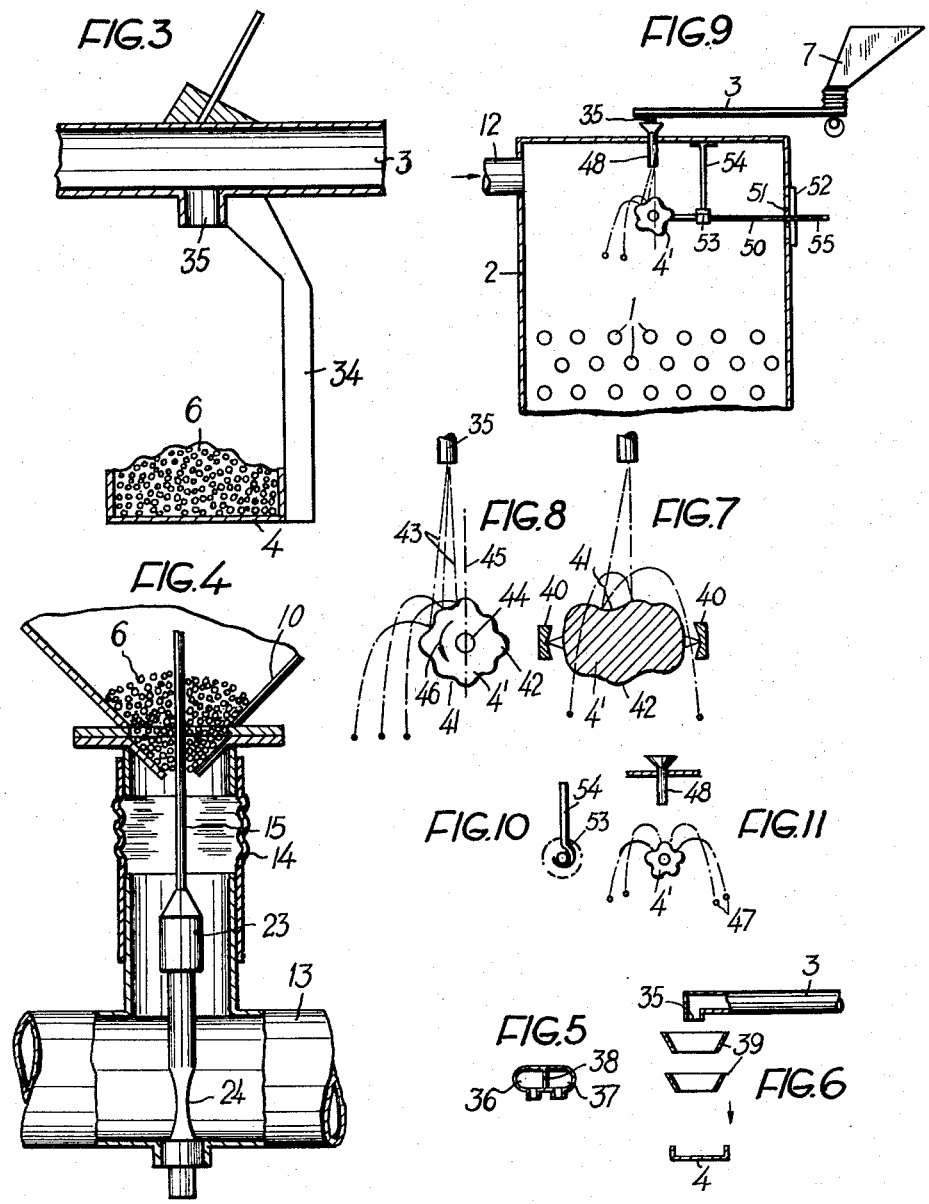

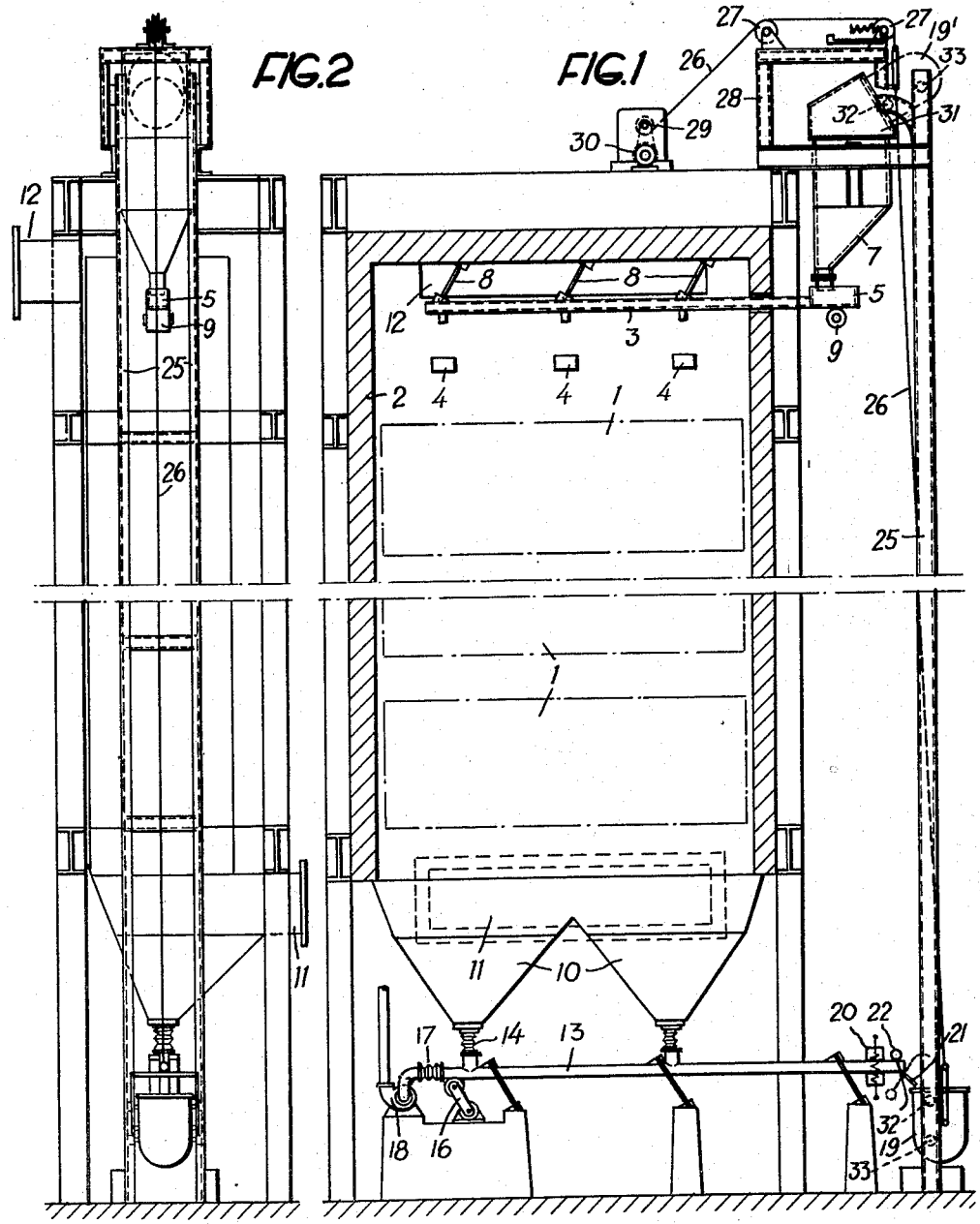

United States Patent Office 2,962,264
Patented Nov. 29, 1960

2,962,264

MEANS FOR CLEANING HEATING SURFACES IN ECONOMIZERS AND SIMILAR EQUIPMENT

Erik Oskar Enerus, Stockholm, Sweden, assignor to K. E.-Patenter AB, Stockholm, Sweden, a corporation of Sweden Filed Mar. 22, 1957, Ser. No. 647,917

Claims priority, application Sweden Apr. 21, 1956

2 Claims. (Cl. 257—1)

The present invention refers to means for cleaning heating surfaces in economizers and similar equipment with the aid of particles falling against the heating surfaces, said particles consisting for instance of steel shot and being designated cleaning solids in the following, these solids being conveyed to the upper part of the equipment, where a supply container provided with a feeding device may be arranged, and being then caused to fall through the installation via a spreading contrivance, whereupon they are reconveyed to said upper part.

In the numerous proposals for means of this type brought to notice there are particularly three items involving marked difficulties sought to be mastered, namely, the spreading of the cleaning solids, such as steel shot, in a manner to make them hit as far as possible all surfaces to be cleaned, the separation of the falling cleaning solids and the substances torn off the heating surfaces from one another, after the former have passed through the equipment, and, finally, the reconveyance of the falling cleaning solids to the upper part of the installation.

The primary object of the invention is to form the conveying and spreading contrivances so as to permit them effectively to perform their function and so that the cleaning solids, after the heating surfaces have been cleaned, may in turn be cleaned effectively and returned to the upper part of the installation with a minimum of wear.

The invention also has for its object to facilitate such an installation and formation of the conveying means that no appreciable increase of the total height of the equipment is called for.

A further object of the invention is to facilitate spreading of the falling solids so that the heating surfaces may be cleaned in their entirety.

A previously known method of removing soot and other impurities sticking to the cleaning solids consists of flushing a portion of the flue gases taken from the installation as a counter-current against the cleaning solids after the latter have fallen out at the bottom of the installation. According to another method the cleaning solids are subjected, for instance by means of a powerful air current, to rapid cooling to make the coating flake off. These methods have not proved to be sufficiently effective, and the cooling would cause great drawbacks in cases where so low temperatures would be obtained that moisture would precipitate and the hydroscopic impurities on the cleaning solids would involve sticking together of the latter with disturbances in the operation in consequence thereto.

The reconveyance of the cleaning solids to the upper part of the equipment would previously be carried out by means of continuously operating elevators, worm conveyors or by a powerful air current in a pipe conduit having the solids passing therethrough. These contrivances are worn out in a short time, and the cooling of the solids brings about the disadvantages touched upon hereinabove. In conveying with the aid of air the power consumption also becomes disproportionately large.

The known spreading means with rotating elements have proved to have an insufficient spreading effect and a short life.

Said drawbacks in previously known means are methods are obviated through the present invention.

The invention is distinguished, above all, by the feature that the means for feeding the cleaning solids into the installation above the heating surfaces and for feeding them out of the installation comprise vibrating members facilitating a substantially horizontal transport of the cleaning solids to and from the installation.

This vibration transport has the advantage of permitting a lateral feeding movement into the installation, so that no additional space in the vertical direction is called for to introduce the cleaning solids into the same. The conveying contrivance in consideration may thus simply consist of a horizontal or slightly sloping pipe or a corresponding channel, wherein the cleaning solids are fed to one or more openings by shaking or vibrations.

In an advantageous form of embodiment of the invention, the vibrating contrivance for the discharge of the cleaning solids from the lower portion of the installation is constructed to separate material originating in the heating surfaces from the cleaning solids.

The spreading device may consist of a bowl, onto which the cleaning solids fall down so as to spread over the heating surfaces by ricochetting against particles previously caught in the bowl and remaining therein.

According to another embodiment, the spreading device consists of a deflecting member, which is substantially stationary but carried rotatably so as to be adjusted through the impact from the cleaning solids or through manual actuation so as to present continuously new surfaces to the arriving cleaning solids.

Further features of the invention will appear from the following description of a few embodiments intended by way of example to elucidate the application of the invention. Fig. 1 shows an economizer with a cleaning means according to one embodiment of the invention by way of diagrammatic representation and viewed broadly in vertical section. Fig. 2 shows a lateral projection of the contrivance according to Fig. 1, Fig. 3 a vertical section of a portion of the spreading device according to one embodiment, and Fig. 4 a vertical section on a larger scale of a feed-down contrivance at the lower portion of the installation. Fig. 5 shows a cross section through a feed pipe, and Fig. 6 shows a modified construction of the spreading contrivance according to Fig. 3, substantially in vertical section. Figs. 7 and 8 show a further embodiment of the spreading device in two vertical projections at right angles to each other by way of diagrammatic representation. Fig. 9 shows a further embodiment of the means in the upper part of the installation, and Figs. 10 and 11 shows details of this embodiment.

The drawings show in Figs. 1 and 2 an installation comprising an economizer (a steam boiler or a combination of an economizer and a steam boiler with or without an air-preheater), the heating surfaces of which to be cleaned are in the construction shown conceived of as consisting of tube bundles 1, for example, arranged in a shaft 2 above one another. Extending into the upper portion of the shaft 2 is/are one or more feed pipes 3 from one side of the shaft. These pipes have outlet openings above spreading contrivances consisting substantially of deflecting members 4 upon which the cleaning solids fall. The outer ends of the pipes extend from a feeding trough 5, which receives cleaning solids, such as steel shot 6 (Fig. 3) from a supply container 7, and which feeds these solids continuously or intermittently into the pipes 3. The feed pipes 3 are carried, as is the feeding trough 5, by hangers, links or springs 8 and are connected to a vibrator 9 or the like, which brings them into vibrations or shaking, so that the cleaning solids will by reason of these vibrations be conveyed from the trough 5 to the outlet openings. The shafts 2 merge at the bottom into a pair of pockets 10, in which the steel shot is collected after having fallen down through the shaft. The latter is provided at the bottom with a flue gas outlet 11 to deflect the flue gases arriving at the top through an inlet 12 to a chimney passage.

The pockets 10 are connected at the bottom to a discharging device for the cleaning solids collected in the pockets, said device being also constructed for the separation of impurities through vibration. This device comprises, first, a tubular vibration channel 13, to which the cleaning solids are conveyed from each pocket through a flexible pipe connection 14, and, second, a feed rod 15, which is secured to the bottom of the vibrating channel and extends upwardly into the bottom opening of the pocket, as shown in Fig. 4. The shaking channel is connected for instance to an electric vibrator 16. The shaking channel consists of one or more pipes, one end of which communicates through a hose connection 17 with the suction side of a fan 18, and the other end of which is uncovered and opens above a container 19, when the latter takes its lowermost position, the loading position. In the pipe 13 near the end thereof located at the container 19 there is arranged, for instance, an electric heating element 20 or some other source of heat for the heating of the air sucked into the pipe, for the purpose of keeping the temperature of the cleaning solids so high that condensation of steam on the cleaning solids is prevented. To the same end, hot flue gases may be conducted into the pipe 13. The pipe 13 may be closed by means of a cut off device comprising a pivotally mounted damper 21, which in its open position bears on the edge of the container 19 and is maintained in closed position by a counterweight 22.

An example of the detailed formation of the discharging contrivance for the cleaning solids will appear from Fig. 4. The feed rod 15 extends upwardly through the bottom opening of the pocket 10 into the collection of cleaning solids to be found in the lower portion of the pocket. It is provided with a weight 23 at a distance above the lower end thereof, which is provided above the attachment in the bottom of the channel 13 with a narrower portion 24.

The container 19 is constructed so as to be able to return the cleaning solids falling down into the same to the supply container 7 in the upper part of the installation. For this purpose it is adapted to be hoisted along a path formed by a pair of guides 25 extending upwardly to a point above the supply container 7. The damper 21 forms in its open position a bridge adapted to lead the cleaning solids falling down from the shaking channel 13 down into the container 19. The damper is folded up by the container 19, when the latter is hoisted. A hoisting means for the operation of the container 19 may consist of a rope 26 extending over rope pulleys 27 on a framework 28, and of a windlass 29 with a driving motor 30. The guides 25 are provided at the top with curved branch tracks 31, into which the upper guide pins 32 of two pairs of guide pins 32, 33 located on each side of the container 19 may engage, as is shown in an upper position, the unloading position 19', of the container.

For the reconveyance of the cleaning solids up to the supply container 7 any suitable means other than that shown in the drawings may be made use of.

Fig. 3 shows on a larger scale the spreading means with the deflecting member in the form of a bowl 4. The bowl is here carried by a holder 34 secured to the feed pipe 3, so that the bowl is located directly underneath the outlet opening 35 on the lower side of the pipe.

The mode of operation of the apparatus described is broadly as follows:

Steel balls falling down into the bowls 4 through the pipes 3 ricochet against balls to be found previously in the bowls so as to be spread in all directions over the heating surfaces or tube bundles 1 therebeneath. When the steel balls hit the heating surfaces, they strike against soot and other impurities deposited on the heating surfaces so as to loosen said impurities. By the fact that some of the steel balls remain in the bowls, the surface against which the steel balls ricochet in the bowls will always alter its character, whereby the greatest conceivable variation of the spreading direction of the falling balls is brought about. A large portion of the impurities torn off the heating surfaces is in this case entrained with the downwardly directed flue gas currents in the shaft 2 out into the chimney passage 11. The rest of the impurities is collected together with the steel balls in the pockets 10. The feed rods 15 are brought into oscillatory movements in the bottom openings of the pockets 10 under the influence of the vibrations imparted to the shaking channel 13 by means of the vibrators 16. On account of the vibrations of the feed rods and the shaking channel the steel balls are fed down into the shaking channel and are conveyed in the latter toward the open end thereof, in order thus to fall down into the conveying container 19. During these proceedings soot and other impurities sticking to the steel shot are loosened in order then to be carried away successively by means of the relatively weak air current produced by means of the fan 18. When required, the air current, which may be directed against or in the direction of discharge of the steel balls in the shaking channel, may be cut off by means of the damper 21. When the container 19 has been filled to a suitable level with steel balls, it will be hoisted by means of the hoisting means 26—30, the damper 21 being thus closed. In its uppermost position, the container 19 is emptied into the supply container 7.

On having been emptied the conveying container 19 is lowered by means of the hoisting means into the initial position, whereupon the damper 21 is opened and another batch of steel balls may be collected in said container.

The feed pipe 3, which is closed at the inner end thereof, may contain one or more passages for steel shot. In the construction shown in Fig. 5, there are two discharging passages 36, 37 provided by the fact that the pipe is divided by a longitudinally extending partition 38, each passage being intended to lead cleaning solids from the trough 5 to a corresponding outlet opening 35. Generally, the feed pipe should be made with as many passages as there are discharging openings, and in the construction according to Figs. 1–2 there should consequently be three passages in the pipe 3.

The spreading of the steel balls by means of the deflecting member taking the form of a bowl 4 is improved by the vibrations of the feed pipe. However, the deflecting members may also be rigidly arranged in the flue gas chamber. Then there may be one or more funnels 39, as shown in Fig. 6, through which the solids fall down against the deflecting bowl 4. These funnels are preferably, as is the bowl 4, rigidly arranged in the flue gas chamber of the boiler, and they are adapted to act as guide members preventing the balls from falling down from the opening 35 laterally of the bowl 4.

The deflecting member is worn out by the cleaning solids ricochetting thereagainst. To increase the life of the deflecting member, it may be constructed as is shown in principle in Figs. 7 and 8. Here, the deflecting member 4' is rotatably mounted upon a stationary shaft so that it may be continuously or periodically rotated by the cleaning solids or by manual actuation to present new surfaces to the arriving cleaning solids. Here, the deflecting member broadly takes the form of a sphere or roller which is balanced about a horizontal axis determined by a pair of bearings 40, such as point bearings, about which the roller is freely rotatable. The envelope surface of said member is of an irregular shape, the same being formed with depressions 41 and elevations 42. The balls fall as a somewhat diverging stream 43 from the outlet pipe 35, which is located relatively to the axis of rotation 44 of the member 4' so that the average point of impact of the balls on said member will be located on one side of said axis. This will be seen from Fig. 8, where a vertical plane through the axis of rotation 44 is designated by a chain-dotted line 45. By reason of the impact from the balls hitting said member, the latter will be actuated by a torque so as to be successively rotated in the direction marked by the arrow 46. Said member will thus always present new surfaces, that is to say elevations and depressions, upwardly to the mouth of the pipe 35, so that the balls will ricochet from the member 4' laterally in constantly varying directions. The spread balls are denoted by 47. Spreading is also obtained in a lateral direction, as shown in Fig. 7.

The feed pipe 3, which by being subjected to vibrations feeds cleaning solids from the pocket, may extend immediately above the roof of the economizer shaft 2, as shown in Fig. 9, one or more stationary pipes 48 extending through the roof being adapted to receive the cleaning solids and to guide them against the deflecting member 4'.

The bearings 40 for the deflecting member may be carried by bearing holders, which are rigidly arranged in the roof or on the wall of the economizer. Another possibility having the advantage of permitting a convenient exchange of the deflecting member is shown in Figs. 9–11. Here, the deflecting member 4' is rigidly or rotatably arranged on a rod 50 extending through a bearing 51 in a wicket 52 in one of the side walls of the economizer. The rod 50 is also carried by a supporting bearing 53 on a bracket 54, which may be secured in the roof or on the wall of the economizer.

In this case too, the deflecting member 4' may be arranged with its axis laterally of the center line of the pipe 48. However, since the deflecting member 4' is easily movable about its axis, it will be turned by the impact of the balls, even if the continuation of the center line of the pipe should intersect the axis of rotation of the deflecting member. This depends on the fact that the balls can never be caused to fall so exactly that the same number of balls would always fall on the one as on the other side of the axis of rotation, the average point of impact of the balls being still located on the one side of said axis of rotation, so that a turning moment is produced.

However, the turning movement of the deflecting member need not be effected by the balls, said movement permitting instead of being performed manually, that is to say, by turning of the rod 50. This turning movement is then substantially intended to alter the position of the deflecting member, so as to cause the latter to be worn alike on all sides. The rod may be provided at the extreme end thereof with a non-round stud 55, where a hand wheel, crank or other operating device may be secured to facilitate the turning movement.

In order that the deflecting member shall permit of being easily exchanged, the wicket 52 is removably arranged in an opening in the wall of the economizer, the supporting bearing 53 being also open for the same purpose, as shown in Fig. 10, so that the rod 50 may be raised out of the same after the wicket 52 has been loosened. The wicket 52 with the rod mounted therein may thus be removed, which is then also the case with the deflecting member 4' secured on the rod.

What I claim is:

1. In heating apparatus having a casing with a flue gas inlet and a flue gas outlet, and heating exchange surfaces in said casing swept by the gas passing from said inlet to said outlet; means for cleaning said heating exchange surfaces comprising vibratory means for supplying cleaning solid particles into said casing above said heating exchange surfaces, a deflecting member in said casing beneath and spaced from said vibratory supply means and above and spaced from said heating exchange surfaces for radially outwardly dispensing the solid particles which fall thereon, a supporting rod horizontally and rotatably mounted in said casing for angular movement about its longitudinal axis, said deflecting member being rotatably connected to said supporting rod for rotation about a normally-horizontal axis normal to the longitudinal axis of said rod, whereby angular movement of said supporting rod about its longitudinal axis will vary the angle of inclination to the horizontal of the axis of rotation of said deflecting member to expose fresh surfaces thereof to the falling solid particles.

2. Apparatus as defined in claim 1 wherein said deflecting member has a generally convex deflection surface presented to the falling solid particles, the peripheral surface of said deflection member having a plurality of depressions and projections therein for improving the spreading effect of said solid particles.

References Cited in the file of this patent

UNITED STATES PATENTS

| | | |
|---|---|---|
| 1,904,292 | Duncan | Apr. 18, 1933 |
| 2,183,496 | Peters | Dec. 12, 1939 |
| 2,210,486 | Johnson | Aug. 6, 1940 |
| 2,325,715 | Strain | Aug. 3, 1943 |
| 2,564,983 | Lenhart et al. | Aug. 21, 1951 |
| 2,761,652 | Broman | Sept. 4, 1956 |
| 2,762,610 | Puhr-Westerheide | Sept. 11, 1956 |
| 2,785,013 | Stearns | Mar. 12, 1957 |
| 2,819,788 | Howard | Jan. 14, 1958 |